3,465,035
PROCESS FOR PURIFYING TEREPHTHALIC ACID
Kohei Nakaguchi, Osaka, Hirokazu Arai, Ibaragi-shi, Nakataro Kondo, Niihama-shi, and Kuniyoshi Manabe, Takatsuki-shi, Japan, assignors to Sumitomo Chemical Company, Ltd., Osaka, Japan, a corporation of Japan
No Drawing. Filed Nov. 22, 1965, Ser. No. 509,151
Claims priority, application Japan, Nov. 25, 1964, 39/66,527
Int. Cl. C07c 51/42, 63/26
U.S. Cl. 260—525                    4 Claims

ABSTRACT OF THE DISCLOSURE

Crude terephthalic acid obtained by oxidation of 1,4-dialkylbenzene or thermal rearrangement of benzene carboxylic acids according to Henkel process, is purified by dissolving the crude terephthalic acid at a temperature of 80°–190° C. in an aqueous solution containing an alkali metal or ammonium salt of formic acid, acetic acid, propionic acid, oxalic acid, tartaric acid, citric acid, glycolic acid or maleic acid, and 5–120 mole % based on said salt of the corresponding free acid, and then lowering the temperature of the obtained terephthalic acid aqueous solution to a temperature of 0°–100° C. to separate crystalline terephthalic acid.

---

This invention relates to a process for purifying terephthalic acid.

Terephthalic acid is useful as a material for polyethylene terephthalate. The terephthalic acid is required to be as pure as possible.

Terephthalic acid obtained by oxidation of 1,4-dialkylbenzene such as p-xylene or rearrangement of benzenecarboxylic acid, contains impurities which cause coloration when polymerized. Terephthalic acid was purified by use of organic solvents such as pyridine, dimethyl sulfoxide, dimethyl formamide and the like. These organic solvents, however, are unstable in themselves in air and easily form addition products with terephthalic acid, so that difficulties are encountered in the purification and in recovering purer terephthalic acid. In a purification process in which acetic acid or water was used as a solvent, high pressure and such elevated temperatures as 200°–240° C. are required to put it into practice.

Further in a process where an aqueous alkali salt solution was used, acidification was required afterwards. If sulfuric acid, for example, is used, an aqueous solution of potassium, sodium or ammonium sulfate is by-produced, so that it is not economical. Moreover, the process requires a large amount of active carbon for decolouring. Recently, there was revealed (British Patent Specification 989,438) a process wherein terephthalic acid is recrystallized with water in the presence of 0.2–1.2 times the mole of terephthalic acid of alkali metal or ammonium salts of weak acids. The process is not satisfactory, because monoalkali salt of terephthalic acid is undesirably incorporated into the recrystallized terephthalic acid. Also, the process must be operated at high temperature and under high pressure.

The present inventors have found that terephthalic acid dissolves to a considerable extent at elevated temperatures in an aqueous solution containing as main components an organo-carboxylic acid and an alkali metal or ammonium salt thereof, and that only the terephthalic acid deposits when said solution is cooled.

It is an object of the present invention to provide a process for purifying crude terephthalic acid to economically produce highly pure, terephthalic acid in the large grain size which can be polymerized as it is or is easily purified when dimethyl ester or glycol ester of terephthalic acid is synthesized.

Another object of the invention is to provide an excellent solvent system which does not produce any by-products nor addition products with terephthalic acid in the purification procedure.

The other object is to provide a purification process which can be carried out under relatively low pressure, i.e. normal to 4 atm.

Still another object is to provide a purification process which can be applied to a crude material which is obtained by oxidation of p-xylene or "Henkel" process.

The other objects will be apparent from the following descriptions.

According to the present invention, terephthalic acid is dissolved at 80°–190° C. in an aqueous solution containing an alkali metal salt or ammonium salt of an organo-carboxylic acid having dissociation constant of from $1.7 \times 10^{-5}$ to $2 \times 10^{-2}$ and 50–120 mole percent based on said salt of the corresponding free organo-carboxylic acid, and the solution is cooled to deposit and separate terephthalic acid crystals.

The organo-carboxylic acid having dissociation constant of from $1.7 \times 10^{-5}$ to $2 \times 10^{-2}$ includes formic, acetic, propionic, oxalic, tartaric, citric, glycolic and maleic acids. Primary dissociation constant ($K_1$) of terephthalic acid is $3.1 \times 10^{-4}$, but the acids to be used herein should not always have higher dissociation constants. Terephthalic acid is markedly low in solubility in water, and any organo-carboxylic acid having a dissociation constant of more than $1.7 \times 10^{-5}$ may be used to deposit terephthalic acid, so long as ti is well soluble in water. That is, terephthalic acid is deposited even by use of acetic acid (dissociation constant: $1.86 \times 10^{-5}$). Further, in case the acid employed is excessively strong, the solubility of terephthalic acid is rather lowered. However, an organo-carboxylic acid having a dissociation constant of less than $2 \times 10^{-2}$ can be used without such anxiety. Oxalic acid which has a primary dissociation constant greater than said range may be used in the form of acidic alkali oxalate, whose secondary dissociation constant is within the aforesaid range.

The alkali metal salts or ammonium salts of the above-mentioned acids have an effect of increasing the solubility of terephthalic acid. The alkali metal includes sodium and potassium. The effect is seen at a concentration as low as $10^{-2}$ equivalent/l in water, and the upper limit of effective amount is the saturation concentration in the presence of the acid. Under the condition that the acid is present in the minimum amount required to be recovered as terephthalic acid, the solubility of terephthalic acid increases in proportion to the salt concentration in case said concentration is low. As the salt concentration becomes higher, however, the solubility moderately increases, reaches maximum at a certain salt concentration and tends to be lowered at the saturation point of salt concentration. Therefore, an ordinarily adopted salt concentration is perferably within the range of from ⅕ to ½ of the saturation concentration of the salt employed.

However, in case an aqueous solution containing said salt alone is used, a monoalkali terephthalate partly deposits, and in order to prevent deposition, a corresponding free acid is made present together with the salt. The concentration of the free acid is affected by the kind of the acid, the kind of the alkali employed and the concentration of the salt employed, and hence cannot be regulated. Ordinarily, however, the free acid concentration adopted is within such a range that the pH of the resulting solution becomes about 5.5 to 4 or below, but, in case the salt concentration is high, the acid concentration should be made higher accordingly. Therefore, the acid is used in an amount of 5 to 120 mole percent based on the amount of the salt employed, and when the salt concentration is low, the acid is preferably used in a lower amount within said range, whereas when the salt concentration is high, in a higher amount within said range. In case the amount of the acid is smaller than said range, there occurs the undesirable deposition of a monoalkali terephthalate, while in case the amount of the acid is larger than said range, the solubility of terephthalic acid undesirably becomes lower than a practically usable range.

The proportion of acid and its salt will be illustrated below with reference to a system comprising acetic acid and sodium acetate, for example.

An aqueous solution prepared by dissolving 1 mole of sodium acetate and 0.254 mole of acetic acid in 1 l. of water dissolves 3.0 g. (0.018 mole) of terephthalic acid at 24° C., 31 g. (0.18 mole) at 100° C., 50 g. (0.301 mole) at 124° C., 83 g. (0.50 mole) at 160° C., and 100 g. (0.602 mole) at 176° C., and the terephthalic acid dissolved by temperature increase deposits as acid on cooling. When compared with the case when water is used, the solubility of terephthalic acid for said aqueous solution corresponds to 80 times at 24° C., 60 times at 100° C., 60 times at 124° C., 31.3 times at 160° C., and 17 times at 176° C. It is considered that the terephthalic acid is dissolved in the form of a disodium terephthalate and the free acetic acid is dissolved in a molecular state in water.

As is clear from the above illustration, the amount of the carboxylic acid salt to be added is preferably more than an amount sufficient to convert two carboxyl groups of terephthalic acid into alkali salts, i.e. more than twice the mole of terephthalic acid. In case the amount of said salt is less than twice the mole of terephthalic acid, solubility of terephthalic acid in water is not so high, because monoalkali salt thereof is formed in place of the dialkali salts which are more easily soluble. High temperature and high pressure are required in order to completely dissolve the terephthalic acid.

If a solution prepared by dissolving 1 mole of sodium acetate in 1 liter of water is used, about 45 g. of terephthalic acid is dissolved at 100° C., but when the solution is cooled, a part of the terephthalic acid is precipitated as a monosodium terephthalate. Therefore, terephthalic acid cannot be produced in the pure form. Further, in the above case, acetic acid is formed in the mother liquor and in case the amount of the acetic acid becomes more than about 0.2 mole, the mother liquor can be used as a recrystallization solvent for terephthalic acid.

The amount of acetic acid required as a recrystallization solvent for terephthalic acid is decided depending on the concentration of sodium acetate and the temperatures adopted in the recovery and filtration of terephthalic acid. Generally, however, the higher the concentration of sodium acetate, the larger becomes the amount of acetic acid required. In case the amount of acetic acid is made larger, the solution is farther from the zone where monosodium terephthalate is deposited and thus there is no fear of monosodium terephthalate incorporation. In this case, however, the amount of terephthalic acid dissolved at a high temperature side is lowered. It is therefore desirable that the amount of acetic acid is somewhat greater than the minimum required amount. Further, in case potassium acetate is used in place of sodium acetate, the amount of required acetic acid becomes more than twice, when compared at the same molar concentration.

The temperature to be adopted in dissolving terephthalic acid is preferably in the range of from 80° to 190° C. At a temperature higher than 200° C., the solubility of terephthalic acid is high but the operation pressure is elevated to make the operation difficult in practice.

The vapor pressure of the terephthalic acid solution prepared in accordance with the process of the present invention is substantially the same as that of water.

The temperature employed in cooling the solution to deposit and separate terephthalic acid crystals may be any temperature below the saturation temperature of terephthalic acid. In order to make the operation easier, however, a temperature of from 0° to 100° C. is preferred. The lower the temperature, the more increases the recovery rate of terephthalic acid. In this case, however, the cost for cooling the solution increases. Accordingly, in order to lower the cost per recovered amount of terephthalic acid, it is desirable to adopt a somewhat high temperature, e.g. 25°–100° C.

The thus dissolved terephthalic acid is cooled to deposit its crystals, whereby the terephthalic acid is purified. In the above case, components separated from the crude terephthalic acid are those which are more easily water-soluble than terephthalic acid, e.g. benzenecarboxylic acids other than terephthalic acid, such as benzoic, isophthalic, phthalic, trimesic and the like acids; benzeneoxycarboxylic acids; and carboxybenzaldehydes. In addition, various metals soluble in acid are simultaneously removed.

In case terephthalic acid for the direct polymerization is to be obtained, aldehydes and ketones should be removed. Therefore, in case a terephthalic acid high in content of such impurities (e.g. one obtained by the oxidation of p-xylene or the like) is used as the starting material, it is preferable to subject the terephthalic acid solution in the present solvent system to such operation as oxidation, reduction, adsorption and the like, before cooled.

The said solution of terephthalic acid is weakly acidic, i.e. pH below about 5.5, and the absorptivity of active carbon is favorably displayed as compared with the case of an aqueous alkali terephthalate solution, so that active carbon may be used in such a small amount as about ⅕–¼ the amount required in the case of the aqueous alkali terephthalate solution.

In case a medium of acetic acid system is used and a permanganate is employed as an oxidizing agent, it precipitates in the form of manganese dioxide, not being dissolved in the form of manganese ions, so that it is easily separated only by filtration. Further, the oxidation loss of acetic acid itself in the treatment is scarcely observed.

When a bichromate is used as the oxidizing agent, the solution is low in pH and hence is high in oxidizing power, and therefore the required amount of the oxidizing agent may be far smaller than in the case of the aqueous alkali terephthalate solution to give the same effect as in said case.

For the reduction, there is ordinarily adopted a hydrogenation process using platinum, palladium, nickel or cobalt as a catalyst. According to said oxidation or reduction operations, aldehydes and ketones in the terephthalic acid are converted into harmless substances, and the terephthalic acid is further purified by adsorption treatment to obtain a high purity terephthalic acid.

The grain size of terephthalic acid crystals deposited according to the present process is remarkably larger than the cooling has been effected slowly. A large grain is a needle-like crystal with a size of 2 x 2 x 10 mm., and no small crystals of about 5μ in diameter as seen in the case of acid-deposition by use of sulfuric acid or the like are formed at all. Therefore, the separation from the mother liquor and the washing of crystals are very easy.

The following examples illustrate the invention:

EXAMPLE 1

Respective acids and their salts as shown in Table 1 were dissolved in 100 g. of water. To the solution, 1.0 g. of terephthalic acid was added. The liquid was stirred at 30° C. for 1 hour, was filtered to remove the precipitate formed, and was saturated with the terephthalic acid. In each case, the amount of dissolved terephthalic acid was less than 0.5 g. To the liquid was added 3.0 g. of a crude terephthalic acid (containing 2.3% by weight of benzoic acid) obtained by the acid-deposition of an aqueous dipotassium terephthalate with benzoic acid. The liquid was stirred and heated in a visible-type autoclave to dissolve the crude terephthalic acid. The liquid was allowed to cool to 30° C., and the resulting precipitate was recovered by filtration, was washed with 10 cc. of cold water and was then dried to obtain a purified terephthalic acid. The results of analysis of each acid were as shown in Table 1.

C. At this time, the pH of the solution was 5.40. To the hot solution, 1.5 g. of active carbon (Shirosagi C.) was added. After stirring for 30 minutes, the liquid was filtered and the filtrate was cooled to deposit terephthalic acid. The terephthalic acid had a 4-carboxybenzaldehyde content of 0.18% and an absorption coefficient of 0.056. The terephthalic acid was again subjected to the same treatment to obtain a terephthalic acid having 4-carboxybenzaldehyde content of 0.11% and an absorption coefficient of 0.029.

TABLE 1

| Starting solution | | | Dissolving temperature (° C.) | Solubility ratio compared with water at same temperature (times) | Amount of benzoic acid in purified terephthalic acid (percent by weight) | Amount of monoalkali salt in purified terephthalic acid (by acid number) (mole percent) |
|---|---|---|---|---|---|---|
| Water (g) | Salt (mole) | Acid (mole) | | | | |
| 100 | Sodium acetate 0.100 | Acetic acid 0.0165 | 105 | 94 | 0.12 | <1 |
| 100 | Ammonium acetate 0.115 | Acetic acid 0.0845 | 134 | 29 | 0.08 | <1 |
| 100 | Sodium formate 0.196 | Formic acid 0.0090 | 164 | 8.6 | 0.18 | <1 |
| 100 | Potassium oxalate 0.0886 | Oxalic acid 0.0114 | 783 | 3.9 | 0.10 | <1 |
| 100 | Sodium glycolate | Glycolic acid 0.0682 | 164 | 8.6 | 0.15 | <1 |
| 100 | Monodiuм maleate 1.795 | Maleic acid 0.205 | 190 | 2.0 | 0.11 | <1 |

EXAMPLE 2

Acetic acid and its salt were dissolved in 500 g. of water, and the solution was charged together with 50 g. (0.301 mole) of terephthalic acid into a titanium-made autoclave. The liquid was stirred at 200° C. for 1 hour and was cooled, and the resulting precipitate was recovered at 30° C. by filtration. After analyzing a monoalkali terephthalate in said precipitate with X-rays, the precipitate was washed with 500 g. of water at about 100° C. to obtain a purified terephthalic acid. The monoalkali terephthalate content in the precipitate recovered at 30° C. and the yield of purified terephthalic acid based on the precipitate recovered at 30° C. are shown in Table 2.

As a comparative example, the same operations were applied one time to an aqueous solution (pH=7.2) of dipotassium terephthalate obtained by dissolving crude terephthalic acid in an aqueous potassium hydroxide solution. The solution was subjected to acid-deposition with sulfuric acid to merely obtain a terephthalic acid having a 4-carboxybenzaldehyde content of 0.55% and an absorption coefficient of 0.16.

EXAMPLE 4

1.054 moles of sodium acetate and 0.210 mole of acetic acid were dissolved in 1,000 g. of water. To the solution, 50.0 g. of the same crude terephthalic acid as used in Example 3 was added and was heated and dissolved at 124° C. in an enamelled pressure vessel. To

TABLE 2

| No. | Salt (mole) | Acid (mole) | Monoalkali salt in the precipitate recovered at 30° C. (mole percent) | | Yield of purified terephthalic acid after hot water-washing (mole percent) | |
|---|---|---|---|---|---|---|
| | | | Present example | Comparative example | Present example | Comparative example |
| 1 | Sodium acetate 0.50 | Acetic acid 0.015 | <2 | | 98.7 | |
| 1' | do | Acetic acid 0 | | 22 | | 88 |
| 2 | Sodium acetate 0.060 | Acetic acid 0.125 | <2 | | 98.5 | |
| 2' | do | Acetic acid 0 | | 28 | | 84 |
| 3 | Sodium acetate 0.90 | Acetic acid 0.325 | <2 | | 98.0 | |
| 3' | do | Acetic acid 0 | | 66 | | 64 |
| 4 | Potassium acetate 0.25 | Acetic acid 0.31 | <2 | | 97.8 | |
| 4' | do | Acetic acid 0 | | 42 | | 76 |

In Table 2, each number bearing the mark " ' " is a comparative example in which free acetic acid is absent. In these comparative examples, was used hot water of 30 times the amount of the monoalkali salt in the initial precipitate.

EXAMPLE 3

1.054 moles of sodium acetate and 0.210 mole of acetic acid were dissolved in 1,000 g. of water. To the solution, 31 g. of terephthalic acid (4-carboxybenzaldehyde [1]: 0.41%, absorption coefficient [2]: 0.95) obtained by the air oxidation of p-xylene was added and dissolved at 100°

[1] 4-carboxybenzaldehyde shows a value attained by estimating aldehyde and ketones as 4-carboxybenzaldehyde according to the polaro-analysis process in which benzophenone-carboxylic acid and fluorenone-carboxylic acid are also included.
[2] Absorption coefficient is an absorption coefficient of 380 mμ which was obtained by dissolving terephthalic acid in an aqueous potassium hydroxide solution so that the amount of said acid became 10 g. per 100 cc. of said solution and measuring the solution in a cell (5 cm. long).

the liquid, each 0.5 g. of potassium permanganate crystals were added 3 times at 10 minutes' intervals. Thereafter, the liquid was further stirred for 1 hour and the resulting precipitate of manganese dioxide was separated by filtration at 126° C. The filtrate was cooled to deposit terephthalic acid crystals, which were then washed with 200 cc. of hot water. The thus obtained terephthalic acid had an acid number of 675, 4-carboxybenzaldehyde content of 10 p.p.m. and an absorption coefficient of 0.022, and the yield was 97% leaving out of account 3.0 g. of terephthalic acid remaining in the filtrate.

To 40 g. of said terephthalic acid, 120 g. of water and 10 g. of sodium hydroxide were added, and ethylene oxide was blown into the liquid at 80° C., whereby the liquid became transparent. The transparent liquid was cooled to obtain a precipitate of a bis-beta-hydroxyethyl terephthalate. The precipitate was dissolved in 150 g. of water and the solution was treated 3 times with 1 g. of active carbon at 80° C. The solution was then cooled and the precipitate was filtered and dried to obtain a purified bis-beta-hydroxyethyl terephthalate. The purified terephthalate was polymerized with antimony trioxide in the presence of zinc acetate as a catalyst to obtain an excellent polymer having an intrinsic viscosity of 0.61, a Hasen number of 80 and a melting point of 263° C.

EXAMPLE 5

To the liquid in Example 4 in which crude terephthalic acid had been dissolved at 124° C., 1.5 g. of active carbon was added, and the liquid was stirred for 30 minutes and was then filtered. To the filtrate, each 0.3 g. of potassium permanganate crystals were added 4 times at 10 minutes' intervals. The liquid was stirred for 1 hour and 1.0 g. of active carbon was added to the liquid at said temperature. After stirring for 30 minutes, the liquid was filtered at 126° C. to separate manganese dioxide and active carbon. The liquid was cooled and the deposited purified terephthalic acid crystals were recovered by filtration. The purified terephthalic acid had a 4-carboxybenzaldehyde-content of less than 10 p.p.m. and an absorption coefficient of 0.019, and a polyethylene terephthalate obtained by the direct polymerization thereof with ethylene glycol was an excellent polymer having an intrinsic viscosity of 0.62, a Hasen number of 100 and a melting point of 260° C. Further, to 40 g. of a purified terephthalic acid of this kind which had been obtained in the same manners as above, 100 g. of water and 10 g. of sodium hydroxide were added, and the resulting liquid was reacted under pressure with ethylene oxide at 120° C. to obtain a transparent liquid. The transparent liquid was cooled to recover the resulting precipitate by filtration. The precipitate was dissolved in 200 g. of water at 80° C. and the solution was cooled and was filtered at 30° C. to obtain crystals. The crystals were then dried to form a purified bis-beta-hydroxyethyl terephthalate. The purified terephthalate was polymerized to obtain an excellent polymer having an intrinsic viscosity of 0.64, a Hasen number of 75 and a melting point of 264° C.

EXAMPLE 6

Potassium benzoate was reacted under pressure with carbon dioxide to obtain a reaction product containing a dipotassium terephthalate as a main component. The reaction product was dissolved in 10 times as much of water, and, from the solution, insolubles were separated by filtration to obtain an aqueous solution. The aqueous solution was reacted at two stages with benzoic acid to form a crude terephthalic acid. The crude terephthalic acid had an absorption coefficient of 0.78 and a benzoic acid content of 1.8%. 50 g. of said crude terephthalic acid was added to and was dissolved at 126° C. in an aqueous solution comprising 1,000 g. of water, 1.054 moles of sodium acetate and 0.210 mole of acetic acid. After subjecting the solution 3 times to operations carried out by treating with active carbon for 20 minutes and filtering, the solution was cooled to obtain a purified terephthalic acid having an absorption coefficient of 0.018 and a benzoic acid content of 0.10%. The purified terephthalic acid was directly polymerized with ethylene glycol to obtain an excellent polymer having an intrinsic viscosity of 0.65, a Hasen number of 100 and a melting point of 261° C.

EXAMPLE 7

To a solution prepared by dissolving 1.0 mole of sodium acetate and 0.2 mole of acetic acid in 1,000 g. of water was added 27 g. of a terephthalic acid (terephthaloaldehyde content: 0.51%, absorption coefficient: 1.80) obtained by the air-oxidation of paraxylene. The solution was stirred to dissolve the terephthalic acid at 100° C. To the hot solution, 2 g. of a palladium catalyst (5% Pd on active carbon produced by Degussa Co.) was added, and the liquid was subjected to reduction treatment in the presence of hydrogen gas. Thereafter, the catalyst was removed by filtration, and the liquid was cooled to obtain terephthalic acid crystals. The treating conditions adopted in the above case and the analytical values of the purified terephthalic acid were as shown in the following table:

|  | (1) | (2) | (3) | (4) |
|---|---|---|---|---|
| Total pressure (atm. g.) | 1 0 | 5 | 10 | 5 |
| Treating temperature (° C.) | 97 | 100 | 100 | 140 |
| Treating time (min.) | 60 | 30 | 5 | 5 |
| 4-carboxybenzaldehyde (p.p.m.) | 8 | <5 | <5 | <5 |
| Absorption coefficient | 0.067 | 0.062 | 0.073 | 0.082 |

1 $H_2$-blowing at atmospheric.

Among these, the terephthalic acid (1) was directly polymerized with ethylene glycol to form a polyethylene terephthalate having an intrinsic viscosity of 0.61, a Hasen number of 140 and a melting point of 260° C.

To a liquid which had been obtained under the same reaction conditions as in the case of (1) and which had been freed from the catalyst by filtration, 2 g. of active carbon (Sakura Special Grade produced by Shikoku Kagaku Co.) was added. After stirring for 15 minutes, the liquid was filtered and the filtrate was cooled to obtain a terephthalic acid. The terephthalic acid was directly polymerized with ethylene glycol to obtain a polymer having a Hasen number of 90, a melting point of 216° C. and an intrinsic viscosity of 0.61.

EXAMPLE 8

To a liquid prepared by dissolving 0.9 mole of sodium acetate and 0.1 mole of acetic acid, 28 g. of a crude terephthalate of the same quality as in Example 7 was added and dissolved at 100° C. with stirring. To the liquid, a hydrogenation catalyst was added, and the liquid was subjected to reduction reaction for 60 minutes under a hydrogen pressure of 10 atm. g. The catalyst was removed by filtration and the resulting liquid was cooled to obtain terephthalic acid crystals. The catalysts employed in the above case and the analytical values of the resulting purified terephthalic acid were as shown in the following table:

| Catalyst | Pt (5% on active carbon) | Pd (10% on asbestos) | Ni (1% on diatomaceous earth) | Pd black | Raney nickel NDH | $PdCl_2$ | $Co(NO_3)_2$ | $PdCl_2$ |
|---|---|---|---|---|---|---|---|---|
| Amount of catalyst (g.) | 4 | 4 | 4 | 0.2 | 0.56 | 0.56 | 0.1 | 0.2 |
| Aldehyde (p.p.m.) | 10 | 17 | 45 | 27 | 39 | 25 | 80 | 36 |
| Absorption coefficient | 0.084 | 0.079 | 0.071 | 0.088 | 0.035 | 0.040 | 0.059 | 0.081 |

EXAMPLE 9

To a solution prepared by dissolving 10 moles of sodium acetate and 2 moles of acetic acid in 10 kg. of water, 280 g of a terephthalic acid (4-carboxybenzaldehyde content: 0.11%, absorption coefficient: 0.85) obtained by the air oxidation of paraxylene was added and dissolved at 100° C. To the hot solution, 25 g. of a powdery active carbon (Sakura Special Grade produced by Shikoku Kagaku Kogyosho) was added. The liquid was stirred for 10 minutes and was then filtered. The filtrate was cooled to 35° C., and deposited terephthalic acid crystals were recovered by filtration, washed with water and dried to obtain a purified terephthalic acid.

Subsequently, the active carbon used in the above was repeatedly employed in the same treatments as above. The active carbon could be used 8 times repeatedly. The absorption coefficient of purified terephthalic acid obtained in each time of repeated use of the active carbon, and the Hasen number of a polymer (intrinsic viscosity: 0.60–0.65, melting point: 261–264° C.) obtained by the direct polymerization of said terephthalic acid with ethylene glycol are shown in the following table:

| Time of use of active carbon | Absorption coefficient of purified terephthalic acid | Hasen number of polymer |
|---|---|---|
| 1 | 0.025 | 115 |
| 2 | 0.027 | 120 |
| 3 | 0.030 | 130 |
| 4 | 0.032 | 125 |
| 5 | 0.045 | 130 |
| 6 | 0.050 | 135 |
| 7 | 0.057 | 140 |
| 8 | 0.072 | 160 |

What we claim is:

1. A process for purifying crude terephthalic acid obtained by oxidation of 1,4-dialkylbenzene or thermal rearrangement of benzene carboxylic acids, which comprises (I) dissolving said crude terephthalic acid, at a temperature from about 80° C. to about 190° C. and in an amount greater than the saturation concentration at the temperature obtained in step (II), in an aqueous solution containing
   (a) an alkali metal or ammonium salt of a member selected from the group consisting of formic acid, acetic acid, propionic acid, oxalic acid, tartaric acid, citric acid, glycolic acid and maleic acid, the amount of said alkali metal or ammonium salt being from an amount sufficient to convert two carboxyl groups of said terephthalic acid into alkali metal or ammonium salt to a saturation concentration at the temperature obtained in step (II), and
   (b) 5–120 mole % based on said salt of the corresponding free acid,
and (II) lowering the temperature of the resultant terephthalic acid aqueous solution to a temperature from about 0° C. to about 100° C. whereby crystalline terephthalic acid is separated.

2. a process according to caim 1 wherein said aqueous solution further contains (c) pure terephthalic acid in an amount corresponding to a saturation concentration at the temperature obtained in step (II).

3. A process according to claim 1 wherein said alkali metal is potassium or sodium.

4. A process according to claim 2 wherein subsequent to carrying out step (I) and before carrying out step (II) any aldehydes and ketones present are substantially removed.

References Cited

UNITED STATES PATENTS

| 1,945,246 | 1/1934 | Witzel | 260—525 |
| 2,745,872 | 5/1956 | Carlston et al. | 260—525 |
| 3,247,246 | 4/1966 | Fragen | 260—525 XR |

FOREIGN PATENTS

| 989,438 | 4/1965 | Great Britain. |

BERNARD HELFIN, Primary Examiner